Patented Oct. 23, 1951

2,572,822

UNITED STATES PATENT OFFICE 2,572,822

PREPARATION OF MONO-ETHERS OF 1-4-DIHYDROXYNAPHTHALENE

Carl Mayn Smith, Easton, Pa., assignor to General Aniline & Film Corporation, New York, N. Y., a corporation of Delaware No Drawing. Application December 1, 1948, Serial No. 62,973

7 Claims. (Cl. 260—613)

This invention relates to a process for preparing mono-ethers of 1,4-dihydroxynaphthalene.

The mono-ethers of 1,4-dihydroxynaphthalene, particularly the lower alkyl mono-ethers thereof, are valuable intermediates in the synthesis of certain vat and azo dyestuffs. However, no satisfactory method for their preparation has heretofore been available, and accordingly, the use of compounds of this type has heretofore been quite restricted.

Since the mono-methyl ethers of 1,4-dihydroxynaphthalene have generally been used, the present invention will be described with particular reference to their preparation. However, as pointed out in greater detail below, my process is applicable to the preparation of mono-ethers of 1,4-dihydroxynaphthalene and aliphatic, alicyclic, aromatic and heterocyclic alcohols.

One of the methods that has heretofore been suggested for the mono-methylation of 1,4-dihydroxynaphthalene involves allowing a mixture of this substance and methyl alcohol containing hydrogen chloride to stand at room temperatures (German Patent 173,700). This reaction proceeds very smoothly but gives a yield of approximately 60% of theory. The 1,4-dihydroxynaphthalene used in the foregoing mono-esterification reaction could be prepared by reduction of 1,4-naphthoquinone for instance by treatment of 1,4-naphthoquinone with aqueous stannous chloride and HCl (Russig, J. pr. Chem., vol. 62, page 33). This reaction proceeds very smoothly if the naphthoquinone is very finely dispersed for instance by ball milling with a suitable dispersing agent, or if aqueous methanol is used to obviate the necessity of dispersing the naphthoquinone, and results in the direct isolation of yields of 80 to 85% which can be increased to 90 to 95% by treatment of the mother liquor.

The fact that naphthoquinone can be reduced in the presence of methanol suggested to me that both the reduction and mono-methylation reactions might be carried out in a single step by using a mixture of methanol with stannous chloride and hydrogen chloride. I discovered that this combined reduction and methylation reaction takes place very smoothly, giving approximately 60% yields of 4-methoxy-1-naphthol provided dry methanol, dry stannous chloride and dry HCl are used. The reaction proceeds either at room temperature or can be run in a much shorter time at reflux temperature. However, it appears that 60 to 65% is the maximum yield which can be obtained by this procedure. If milder conditions or shorter reaction times are used, the crude product contains increasing amounts of unmethylated naphthalene diol, while if the concentration of hydrochloric acid be increased or the reaction time extended, almost quantitative yields of the dimethyl ether can be obtained.

I have now discovered that if instead of using gaseous HCl as such in the above reaction I employ phosphorus oxychloride as the source of HCl, I am able to obtain in one step a yield of over 90% of theoretical of the mono-ether of 1,4-dihydroxynaphthalene of good quality. Briefly stated therefore, my process involves heating a mixture of an alcohol, phosphorus oxychloride, stannous chloride and 1,4-naphthoquinone. The 1,4-naphthoquinone is reduced to 1,4-dihydroxynaphthalene and mono-etherified to the corresponding mono-ether of 1,4-dihydroxynaphthalene in one step, with a yield of 90% or higher of the desired mono-ether. It was found that in carrying out the reaction in this manner it was unnecessary to employ either anhydrous stannous chloride or dry methanol and, in addition, that the methylation stopped at the mono stage so that there was obtained in one step a 90% yield of material suitable for use, compared with an overall yield of about 50% for two steps of the known process.

Phosphorus oxychloride appears to be unique in its action in this reaction since such substances as phosphorus trichloride and pentachloride, sulfuryl chloride, thionyl chloride and chlorosulfonic acid have also been tested but were found to be inferior to, or no better than dry compressed HCl. The reason for the unique action of phosphorus oxychloride in this reaction is not fully understood. Undoubtedly, the mixing of methanol and phosphorus oxychloride in the reaction mixture leads to the formation, to some extent, of the methyl esters of phosphoric acid and chlorphosphoric acid as well as hydrogen chloride (gas), and it may be that a by-product of this type catalyzes the reaction or is the active reactant. However, I do not wish to be held to any theory of operation.

As previously indicated, the reaction need not be carried out under completely anhydrous conditions since some moisture can be tolerated. Thus, in practicing the present invention ordinary (wet) methanol and hydrated stannous chloride can be used to good advantage. It will be apparent that moisture which may be present would be removed by reaction with phosphorus oxychloride. However, while extreme precautions need not be taken to keep the reaction mixture anhydrous, it is preferable to carry out the reaction under substantially anhydrous conditions, except for such moisture as may be introduced by the use of ordinary grades of reactants.

The reaction may be carried out at temperatures ranging from room temperature to about 100° C. However, in order to obtain a good rate of reaction, temperatures of from 50° to about 100° C. are preferred, and when employing lower alcohols such as methanol or ethanol the reaction may advantageously be carried out at the reflux temperature and at atmospheric pressure.

It has been found that the ratio of reactants employed in the process of this invention can be varied widely. However, in order to obtain maximum yields of product, the naphthoquinone, stannous chloride dihydrate and phosphorus oxychloride are employed in amounts corresponding at least to the theoretical. If desired, somewhat larger amounts of stannous chloride dihydrate and the phosphorus oxychloride can be used, but are not necessary. In general, it is preferable to employ an amount of alcohol in excess of that theoretically required, and it has been found desirable to use a ratio of alcohol to naphthoquinone ranging from about 5:1 to as high as 20:1, the alcohol thus serving the dual function as a diluent as well as a reactant.

The details of the present invention will be apparent from the consideration of the following specific example in which the parts are by weight.

*Example*

A reactor fitted with a stirrer, thermometer, dropping funnel and reflux condenser was charged with 275 parts of methanol, and there was then added slowly, with stirring, 64 parts of phosphorus oxychloride. When the addition was complete, the mixture was cooled to room temperature and 47.5 parts of stannous chloride dihydrate was added, followed by 30 parts of 1,4-naphthoquinone. The reaction mixture was then heated to reflux temperature, 30 to 35° C., for 65 minutes, during which time the temperature rose rapidly to a final temperature of 68° to 73° C. as the volatile methyl chloride was distilled off through the top of the reflux condenser. The reaction mixture was then drowned, with stirring, in 6000 parts of water containing 300 parts of concentrated hydrochloric acid to precipitate the product. After filtration and drying, there was obtained 30.3 parts of 1-methoxy-4-hydroxynaphthalene which corresponds to 92% of the theoretical. The thus obtained product was of satisfactory purity for use as an intermediate in the synthesis of dyestuffs.

If desired, the product may be further purified by dissolving it in sufficient benzene so that the solution will not crystallize on the filter. The solution may then be heated with a small amount of activated decolorizing carbon (Nuchar) filtered and the major portion of the benzene removed by boiling. The residual concentrate of liquor may then be diluted with 4 to 5 times its volume of hot boiling petroleum ether cooled and filtered. Recovery of the product, which consists of almost white needles, is about 80 to 85%. The resulting product has a melting point of 128° to 130° C.

It will be apparent that by selection of the particular alcohol which is employed in the process, a wide variety of mono-ethers of 1,4-dihydroxynaphthalene may readily be obtained. It has been found that the process is operable when employing aliphatic, alicyclic, aromatic and heterocyclic alcohols. As examples of alcohols which may be employed in place of the methanol specified in the foregoing example, in order to produce corresponding mono-ethers, may be mentioned ethanol, 2-propanol, 1-propanol, allyl alcohol, 1-butanol, 3-butinol-1, 2-butanol, 2-pentanol, cyclohexanol, benzyl alcohol, phenyl ethyl alcohol and tetrahydrofurfuryl alcohol. The reaction products which can be prepared by my process by selection of the alcohol thus include 1-ethoxy-4-naphthol, 4-cyclohexyloxy-1-naphthol, 4-benzyloxy-1-naphthol and 4-tetrahydrofurfuryloxy-1-naphthol, etc.

I claim:

1. The process of producing mono-ethers of 1,4-dihydroxynaphthalene which comprises heating a mixture of a monohydroxy alkane, phosphorus oxychloride, stannous chloride and 1,4-naphthoquinone.

2. The process as defined in claim 1, wherein the monohydroxy alkane is employed in substantial excess.

3. The process of producing lower alkyl mono-ethers of 1,4-dihydroxynaphthalene, which comprises heating a mixture of a monohydroxy lower alkane, phosphorus oxychloride, stannous chloride and 1,4-naphthoquinone.

4. The process as defined in claim 3, wherein a substantial excess of the monohydroxy lower alkane specified is employed.

5. The process of producing 4-methoxy-1-naphthol, which comprises heating a mixture of methanol, phosphorus oxychloride, stannous chloride dihydrate and 1,4-naphthoquinone.

6. The process as defined in claim 5, wherein a substantial excess of methanol is employed.

7. The process as defined in claim 1, wherein the reaction is carried out under substantially anhydrous conditions.

CARL MAYN SMITH.

REFERENCES CITED

The following references are of record in the file of this patent:

UNITED STATES PATENTS

| Number | Name | Date |
| --- | --- | --- |
| 833,605 | Julius | Oct. 16, 1906 |

OTHER REFERENCES

Russig: "Jour. Prak. Chem.," vol. 62, 1900, pages 32–33.